US012586042B2

(12) United States Patent
Tran et al.

(10) Patent No.: US 12,586,042 B2
(45) Date of Patent: Mar. 24, 2026

(54) SYSTEM AND METHOD FOR AUTOMATED LINKING OF VEHICLE REPAIR ESTIMATE RECORD AND VEHICLE DIAGNOSTIC RECORDS

(71) Applicant: Mitchell International, Inc., San Diego, CA (US)

(72) Inventors: Tran Huyen Tran, San Diego, CA (US); Alex Landau, San Diego, CA (US); Mitul Shah, San Diego, CA (US)

(73) Assignee: MITCHELL INTERNATIONAL, INC., San Diego, CA (US)

( * ) Notice: Subject to any disclaimer, the term of this patent is extended or adjusted under 35 U.S.C. 154(b) by 41 days.

(21) Appl. No.: 18/233,247

(22) Filed: Aug. 11, 2023

(65) Prior Publication Data

US 2024/0086864 A1     Mar. 14, 2024

Related U.S. Application Data

(60) Provisional application No. 63/405,774, filed on Sep. 12, 2022.

(51) Int. Cl.
G06Q 10/20     (2023.01)
G06Q 30/04     (2012.01)
G06Q 40/08     (2012.01)

(52) U.S. Cl.
CPC ............. G06Q 10/20 (2013.01); G06Q 30/04 (2013.01); G06Q 40/08 (2013.01)

(58) Field of Classification Search
None
See application file for complete search history.

(56) References Cited

U.S. PATENT DOCUMENTS

| | | | | |
|---|---|---|---|---|
| 10,102,587 B1 * | 10/2018 | Potter | .................... | G08B 21/02 |
| 10,922,726 B1 * | 2/2021 | Nelson | .............. | G06Q 30/0283 |
| 2005/0267774 A1 * | 12/2005 | Merritt | .............. | G06Q 10/0637 705/306 |
| 2014/0058956 A1 * | 2/2014 | Raines | .............. | G06Q 30/0201 705/306 |
| 2014/0081675 A1 * | 3/2014 | Ives | ........................ | G06Q 40/08 705/4 |
| 2017/0293894 A1 * | 10/2017 | Taliwal | .................. | G06V 10/82 |

* cited by examiner

*Primary Examiner* — Paul S Schwarzenberg
(74) *Attorney, Agent, or Firm* — Sheridan Ross P.C.

(57)     ABSTRACT

A computer-implemented method comprises obtaining an electronic claim record comprising claim data describing damage to a vehicle; selecting one or more of an obtained plurality of electronic vehicle diagnostic records by applying the records and claim data as inputs to a trained machine learning model, wherein responsive to the inference input the trained machine learning model selects one or more of the records; obtaining a vehicle repair estimate data structure having a plurality of fields; populating the fields of the vehicle repair estimate data structure with at least one of the claim data and the vehicle data from the selected one or more electronic vehicle diagnostic records; and generating a user interface for presentation to a user on a user device, wherein the user interface includes display elements that represent the populated fields of the generated vehicle repair estimate data structure.

20 Claims, 7 Drawing Sheets

100 ⌐

200

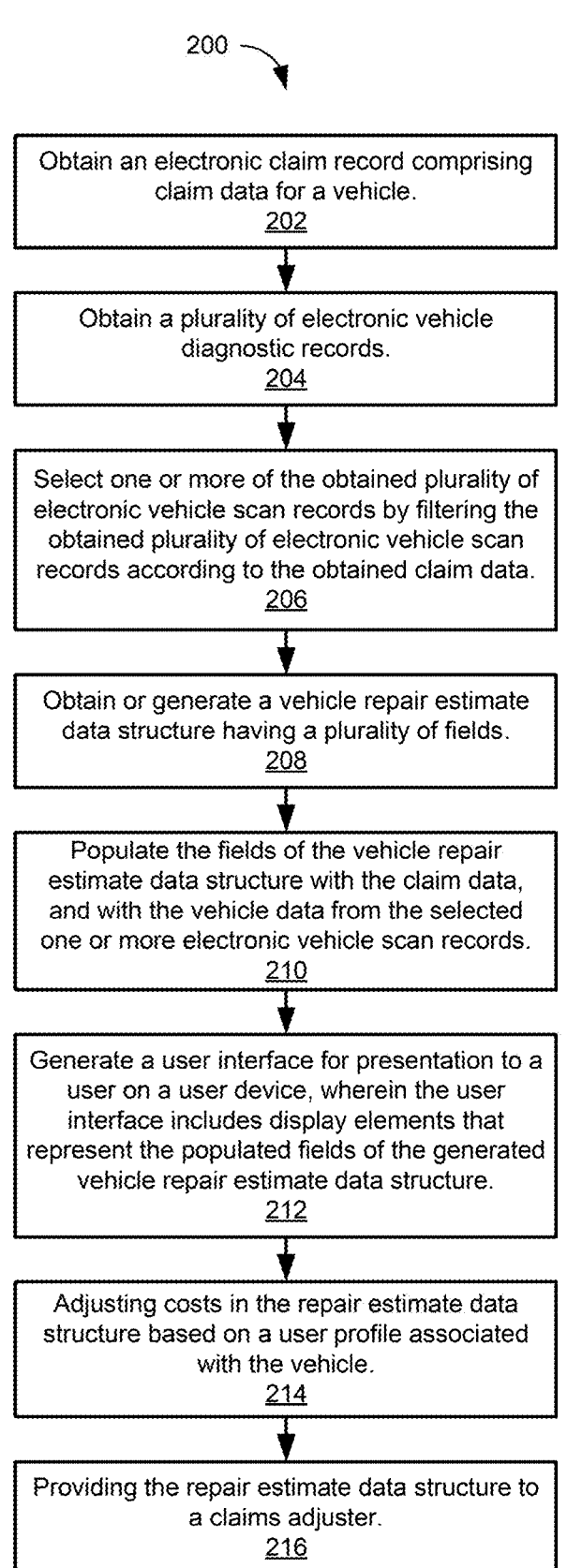

Obtain an electronic claim record comprising
claim data for a vehicle.
202

Obtain a plurality of electronic vehicle
diagnostic records.
204

Select one or more of the obtained plurality of
electronic vehicle scan records by filtering the
obtained plurality of electronic vehicle scan
records according to the obtained claim data.
206

Obtain or generate a vehicle repair estimate
data structure having a plurality of fields.
208

Populate the fields of the vehicle repair
estimate data structure with the claim data,
and with the vehicle data from the selected
one or more electronic vehicle scan records.
210

Generate a user interface for presentation to a
user on a user device, wherein the user
interface includes display elements that
represent the populated fields of the generated
vehicle repair estimate data structure.
212

Adjusting costs in the repair estimate data
structure based on a user profile associated
with the vehicle.
214

Providing the repair estimate data structure to
a claims adjuster.
216

FIG. 2 s, ref sheet

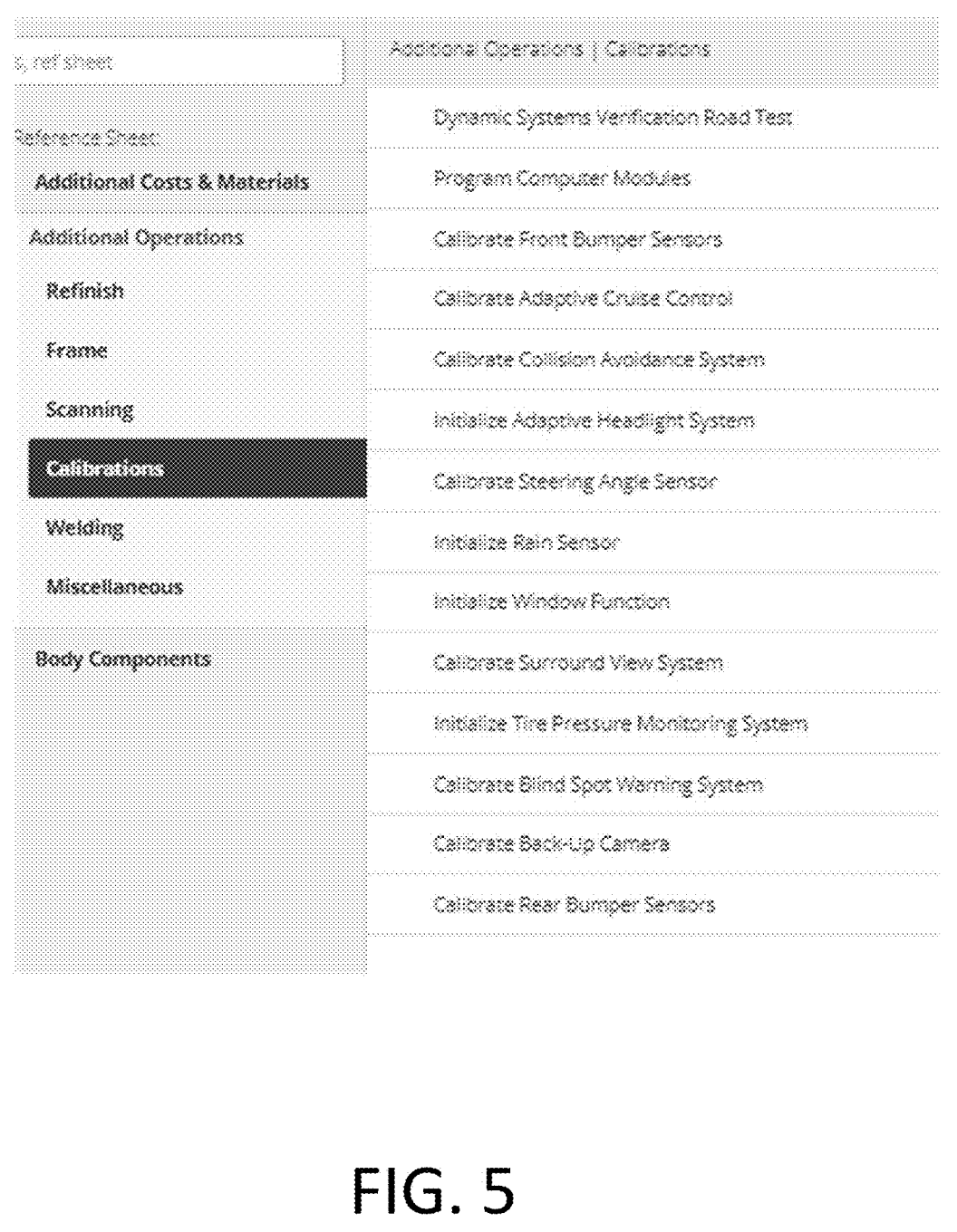

Additional Operations | Calibrations

Reference Sheet

Additional Costs & Materials

Additional Operations

Refinish

Frame

Scanning

Calibrations

Welding

Miscellaneous

Body Components

Dynamic Systems Verification Road Test

Program Computer Modules

Calibrate Front Bumper Sensors

Calibrate Adaptive Cruise Control

Calibrate Collision Avoidance System

Initialize Adaptive Headlight System

Calibrate Steering Angle Sensor

Initialize Rain Sensor

Initialize Window Function

Calibrate Surround View System

Initialize Tire Pressure Monitoring System

Calibrate Blind Spot Warning System

Calibrate Back-Up Camera

Calibrate Rear Bumper Sensors

FIG. 5

SYSTEM AND METHOD FOR AUTOMATED LINKING OF VEHICLE REPAIR ESTIMATE RECORD AND VEHICLE DIAGNOSTIC RECORDS

CROSS REFERENCE TO RELATED APPLICATIONS

The present application claims priority to U.S. Provisional Patent Application No. 63/405,774, filed Sep. 12, 2022, entitled "SYSTEM AND METHOD FOR AUTOMATED LINKING OF VEHICLE REPAIR ESTIMATE RECORD AND VEHICLE DIAGNOSTIC RECORDS," the disclosure thereof incorporated by reference herein in its entirety.

DESCRIPTION OF RELATED ART

The disclosed technology relates generally to generating estimates for repairing vehicles, and more particularly some embodiments relate to linking vehicle diagnostic records with such estimates.

SUMMARY

In general, one aspect disclosed features system for automated generation of a vehicle repair estimate record using a vehicle damage claim and vehicle diagnostic records, comprising: a hardware processor; and a non-transitory machine-readable storage medium encoded with instructions executable by the hardware processor to perform operations comprising: obtaining an electronic claim record comprising claim data for a vehicle, wherein the claim data describes a vehicle and damage to the vehicle; obtaining a plurality of electronic vehicle diagnostic records, wherein each electronic vehicle diagnostic record includes vehicle data obtained electronically from the vehicle during a respective electronic vehicle diagnostic event; selecting one or more of the obtained plurality of electronic vehicle diagnostic records by applying the obtained plurality of electronic vehicle diagnostic records and the obtained claim data as inputs to a trained machine learning model, wherein responsive to the inference input the trained machine learning model selects one or more of the obtained plurality of electronic vehicle diagnostic records, wherein the trained machine learning model has been trained with historical examples of the electronic vehicle diagnostic records and corresponding historical claim data; obtaining a vehicle repair estimate data structure having a plurality of fields; populating the fields of the vehicle repair estimate data structure with at least one of the claim data and the vehicle data from the selected one or more electronic vehicle diagnostic records; and generating a user interface for presentation to a user on a user device, wherein the user interface includes display elements that represent the populated fields of the generated vehicle repair estimate data structure.

Embodiments of the system may include one or more of the following features. In some embodiments, populating the fields of the vehicle repair estimate data structure comprises: searching stored templates by querying a cost database for the stored templates; receiving line items from the cost database responsive to the querying; and adding the line items to the vehicle repair estimate data structure. In some embodiments, the line items include costs, and the operations further comprise: obtaining a stored user profile associated with the vehicle, wherein the stored user profile includes preferences for repair costs; and adjusting individual ones of the costs in the line items according to the user profile. In some embodiments, the operations further comprise: providing the vehicle repair estimate data structure to a claims adjuster. In some embodiments, the operations further comprise: obtaining one or more training data sets comprising the historical examples of the vehicle diagnostic records and corresponding historical claim data; and training the one or more trained machine learning models using the training data set. In some embodiments, the operations further comprise: generating the one or more training data sets. In some embodiments, the operations further comprise: obtaining one or more further training data sets comprising further historical examples of the vehicle diagnostic records and corresponding historical claim data; and retraining the one or more trained machine learning models using the further training data set.

In general, one aspect disclosed features one or more non-transitory machine-readable storage media encoded with instructions that, when executed by one or more hardware processors of a computing system, cause the computing system to perform operations for automated generation of a vehicle repair estimate record using a vehicle damage claim and vehicle diagnostic records, the operations comprising: obtaining an electronic claim record comprising claim data for a vehicle, wherein the claim data describes a vehicle and damage to the vehicle; obtaining a plurality of electronic vehicle diagnostic records, wherein each electronic vehicle diagnostic record includes vehicle data obtained electronically from the vehicle during a respective electronic vehicle diagnostic event; selecting one or more of the obtained plurality of electronic vehicle diagnostic records by applying the obtained plurality of electronic vehicle diagnostic records and the obtained claim data as inputs to a trained machine learning model, wherein responsive to the inference input the trained machine learning model selects one or more of the obtained plurality of electronic vehicle diagnostic records, wherein the trained machine learning model has been trained with historical examples of the electronic vehicle diagnostic records and corresponding historical claim data; obtaining a vehicle repair estimate data structure having a plurality of fields; populating the fields of the vehicle repair estimate data structure with at least one of the claim data and the vehicle data from the selected one or more electronic vehicle diagnostic records; and generating a user interface for presentation to a user on a user device, wherein the user interface includes display elements that represent the populated fields of the generated vehicle repair estimate data structure.

Embodiments of the one or more non-transitory machine-readable storage media may include one or more of the following features. In some embodiments, populating the fields of the vehicle repair estimate data structure comprises: searching stored templates by querying a cost database for the stored templates; receiving line items from the cost database responsive to the querying; and adding the line items to the vehicle repair estimate data structure. In some embodiments, the line items include costs, and the operations further comprise: obtaining a stored user profile associated with the vehicle, wherein the stored user profile includes preferences for repair costs; and adjusting individual ones of the costs in the line items according to the user profile. In some embodiments, the operations further comprise: providing the vehicle repair estimate data structure to a claims adjuster. In some embodiments, the operations further comprise: obtaining one or more training data sets comprising the historical examples of the vehicle diagnostic records and corresponding historical claim data; and training the one or more trained machine learning models using the training data set. In some embodiments, the operations further comprise: generating the one or more training data sets. In some embodiments, the operations further comprise: obtaining one or more further training data sets comprising further historical examples of the vehicle diagnostic records and corresponding historical claim data; and retraining the one or more trained machine learning models using the further training data set.

In general, one aspect disclosed features a computer-implemented method for automated generation of a vehicle repair estimate record using a vehicle damage claim and vehicle diagnostic records, the computer-implemented method comprising: obtaining an electronic claim record comprising claim data for a vehicle, wherein the claim data describes a vehicle and damage to the vehicle; obtaining a plurality of electronic vehicle diagnostic records, wherein each electronic vehicle diagnostic record includes vehicle data obtained electronically from the vehicle during a respective electronic vehicle diagnostic event; selecting one or more of the obtained plurality of electronic vehicle diagnostic records by applying the obtained plurality of electronic vehicle diagnostic records and the obtained claim data as inputs to a trained machine learning model, wherein responsive to the inference input the trained machine learning model selects one or more of the obtained plurality of electronic vehicle diagnostic records, wherein the trained machine learning model has been trained with historical examples of the electronic vehicle diagnostic records and corresponding historical claim data; obtaining a vehicle repair estimate data structure having a plurality of fields; populating the fields of the vehicle repair estimate data structure with at least one of the claim data and the vehicle data from the selected one or more electronic vehicle diagnostic records; and generating a user interface for presentation to a user on a user device, wherein the user interface includes display elements that represent the populated fields of the generated vehicle repair estimate data structure.

Embodiments of the computer-implemented method may include one or more of the following features. In some embodiments, populating the fields of the vehicle repair estimate data structure comprises: searching stored templates by querying a cost database for the stored templates; receiving line items from the cost database responsive to the querying; and adding the line items to the vehicle repair estimate data structure. In some embodiments, the line items include costs, the method further comprising: obtaining a stored user profile associated with the vehicle, wherein the stored user profile includes preferences for repair costs; and adjusting individual ones of the costs in the line items according to the user profile. Some embodiments comprise providing the vehicle repair estimate data structure to a claims adjuster. Some embodiments comprise obtaining one or more training data sets comprising the historical examples of the vehicle diagnostic records and corresponding historical claim data; and training the one or more trained machine learning models using the training data set. Some embodiments comprise generating the one or more training data sets.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 is a flowchart illustrating a process for generating accurate and complete estimates for vehicle repair by automatically linking corresponding vehicle repair estimate records and vehicle diagnostic records according to some embodiments of the disclosed technology.

FIG. 5 depicts a portion of an example user interface that allows a user to add or remove one or more calibration scans in the estimate according to some embodiments of the disclosed technology.

The figures are not exhaustive and do not limit the present disclosure to the precise form disclosed.

DETAILED DESCRIPTION

Modern vehicles include electronic interfaces that can connect to vehicle diagnostic hardware so vehicle data can be automatically obtained from the vehicles by the vehicle diagnostic hardware during a vehicle diagnostic event. As used herein, a "vehicle diagnostic event" may be a diagnostic scan of the vehicle or a calibration scan of one or more sensors of the vehicle. A diagnostic scan or calibration may be performed by connecting an electronic scanning device to a diagnostic connector of the vehicle to collect vehicle data.

The vehicle data obtained during a single vehicle diagnostic event is generally stored in a single electronic record, referred to herein as a vehicle diagnostic record. The vehicle data collected during a diagnostic scan may include diagnostic trouble codes (DTC) collected from the vehicle. The vehicle data collected during a calibration scan may include calibration results for one or more sensors of the vehicle. During its lifetime, a vehicle generally experiences a large number of vehicle diagnostic events. And as vehicles become "smarter" and consequently include more parts and sensors, the number of diagnostic events increase correspondingly. Consequently, a large number of vehicle diagnostic records may be stored for a single vehicle.

When a vehicle is damaged, a vehicle repair estimate is created, often using an electronic vehicle repair data structure. The vehicle also has a diagnostic scan and/or calibration performed, creating one of the many vehicle diagnostic records for the vehicle. Currently the electronic vehicle repair data structure is not automatically linked to the corresponding vehicle diagnostic record. Instead, any linkage between the repair estimate and the diagnostic record is manually performed. In a significant number of cases, the linkage is omitted entirely. In some cases, the repair estimate may be erroneously linked to an older diagnostic record that is unrelated to the repair. The omitted or incorrect linkages may cause the subsequent repair to be improperly documented.

Embodiments of the disclosure provide systems and methods for automatically linking corresponding vehicle repair estimate records and vehicle diagnostic records to generate accurate and complete estimates for vehicle repair. The vehicles may include passenger cars as well as commercial vehicles.

Figure 1:
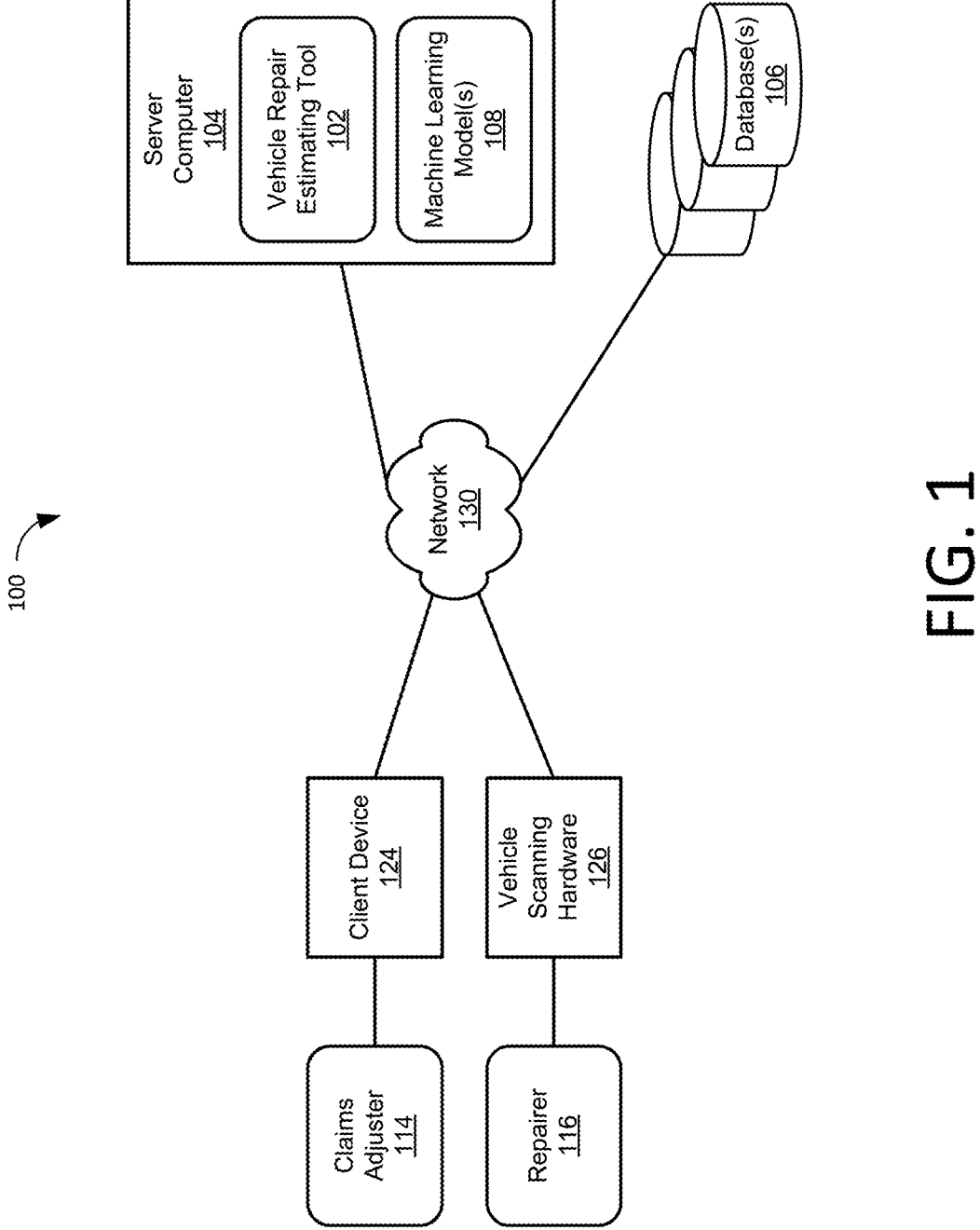
FIG. 1 illustrates a system for automatically linking corresponding vehicle repair estimate records and vehicle diagnostic records according to some embodiments of the disclosed technology.

FIG. 1 illustrates a system 100 for automatically linking corresponding vehicle repair estimate records and vehicle diagnostic records according to some embodiments of the disclosed technology. The system 100 may include a Vehicle Repair Estimating Tool 102. The tool 102 may be implemented as one or more software packages executing on one or more server computers 104. The tool 102 may include one or more machine learning models 108. The machine learning models 108 may be implemented in any manner. The machine learning models 108 may be implemented as trained machine learning models, for example as described below. The system 100 may include one or more databases 106. In some embodiments, the databases 106 may store rules for execution by the tool 102. In some embodiments, the databases 106 may store electronic vehicle repair estimate records and electronic vehicle diagnostic records and related data structures.

Multiple users may interact with the tool 102. For example, referring to FIG. 1, the users may include a claims adjuster 114, a vehicle repairer 116, and the like. Each user may employ a respective device or system. The claims adjuster 114 may employ a client device 124. The repairer 116 may employ vehicle diagnostic hardware 126. Each device may be implemented as a computer, smart phone, smart glasses, electronic embedded computers and displays, and the like. Each user may employ the client device or hardware to access the tool 102 over a network 130 such as the Internet.

FIG. 2 is a flowchart illustrating a process 200 for generating accurate and complete estimates for vehicle repair by automatically linking corresponding vehicle repair estimate records and vehicle diagnostic records according to some embodiments of the disclosed technology. The elements of the process 200 are presented in one arrangement. However, it should be understood that one or more elements of the process may be performed in a different order, in parallel, omitted entirely, and the like. Furthermore, the process 200 may include other elements in addition to those presented. For example, the process 200 may include error-handling functions if exceptions occur, and the like. Portions of the process 200 may be performed by the Vehicle Repair Estimating Tool 102.

Referring again to FIG. 2, the process 200 may include obtaining an electronic claim record comprising claim data for a vehicle, at 202. The claim data may describe the vehicle and a claim event relating to damage to the vehicle. In the example of FIG. 1, the electronic claim record may be created by the claims adjuster 114, the repairer 116, or both, and may be stored in the database(s) 106. The claim may also be generated automatically by a computer system, for example using artificial intelligence inputs.

Referring again to FIG. 2, the process 200 may include obtaining a plurality of electronic vehicle diagnostic records, wherein each electronic vehicle diagnostic record includes vehicle data obtained electronically from the vehicle during a respective electronic vehicle diagnostic event, at 204. The electronic vehicle diagnostic records may be selected according to a Vehicle Identification Number (VIN) of the vehicle identified in the electronic claim record. In the example of FIG. 1, the electronic vehicle diagnostic records may be obtained from the database(s) 106. The electronic vehicle diagnostic records may be generated by diagnostic scans and/or calibration scans before, during, and after the current repair of the vehicle.

The electronic vehicle diagnostic records may include records that are unrelated to the current vehicle repair. For example, the electronic vehicle diagnostic records may include records from previous repairs or maintenance events. Referring again to FIG. 2, the process 200 may include selecting one or more of the obtained plurality of electronic vehicle diagnostic records by filtering the obtained plurality of electronic vehicle diagnostic records according to the obtained claim data, at 206, to select only the electronic vehicle diagnostic record(s) related to the current claim. For example, the electronic vehicle diagnostic records may be filtered according to the date of the claim or repair. In some embodiments, the filtering may be implemented according to deterministic techniques. For example, distances may be calculated between the claim data and the vehicle data in each electronic vehicle diagnostic record. The distances may be used to select one or more of the electronic vehicle diagnostic records. In some embodiments, the filtering may be implemented using a trained machine learning model, for example as described in detail below. For example, the electronic vehicle diagnostic records and the claim data may be applied as inputs to a trained machine learning model that has been trained with historical electronic vehicle diagnostic records and corresponding historical claim data. Responsive to these inputs, the trained machine learning model may select one or more of the obtained plurality of electronic vehicle diagnostic records.

The process 200 may include obtaining or generating a vehicle repair estimate data structure having a plurality of fields, at 208. In the example of FIG. 1, the vehicle repair estimate data structure may be stored in the database(s) 106. In some embodiments, a selected scan/report may also be linked to already-saved preferred values to populate the estimate. These values may include costs stored in templates associated with the estimate, and similar data. These stored values may be based on user input. For example, the user may be associated with a carrier or a repair shop. In most cases, a carrier policy for a certain reimbursement amount is associated with the scan or calibration.

Referring again to FIG. 2, the process 200 may include populating the fields of the vehicle repair estimate data structure with the claim data, and with the vehicle data from the selected one or more electronic vehicle diagnostic records, at 210. Populating the fields of the vehicle repair estimate data structure may involve the use of one or more of the machine learning models 108, for example as described below.

Figure 3:
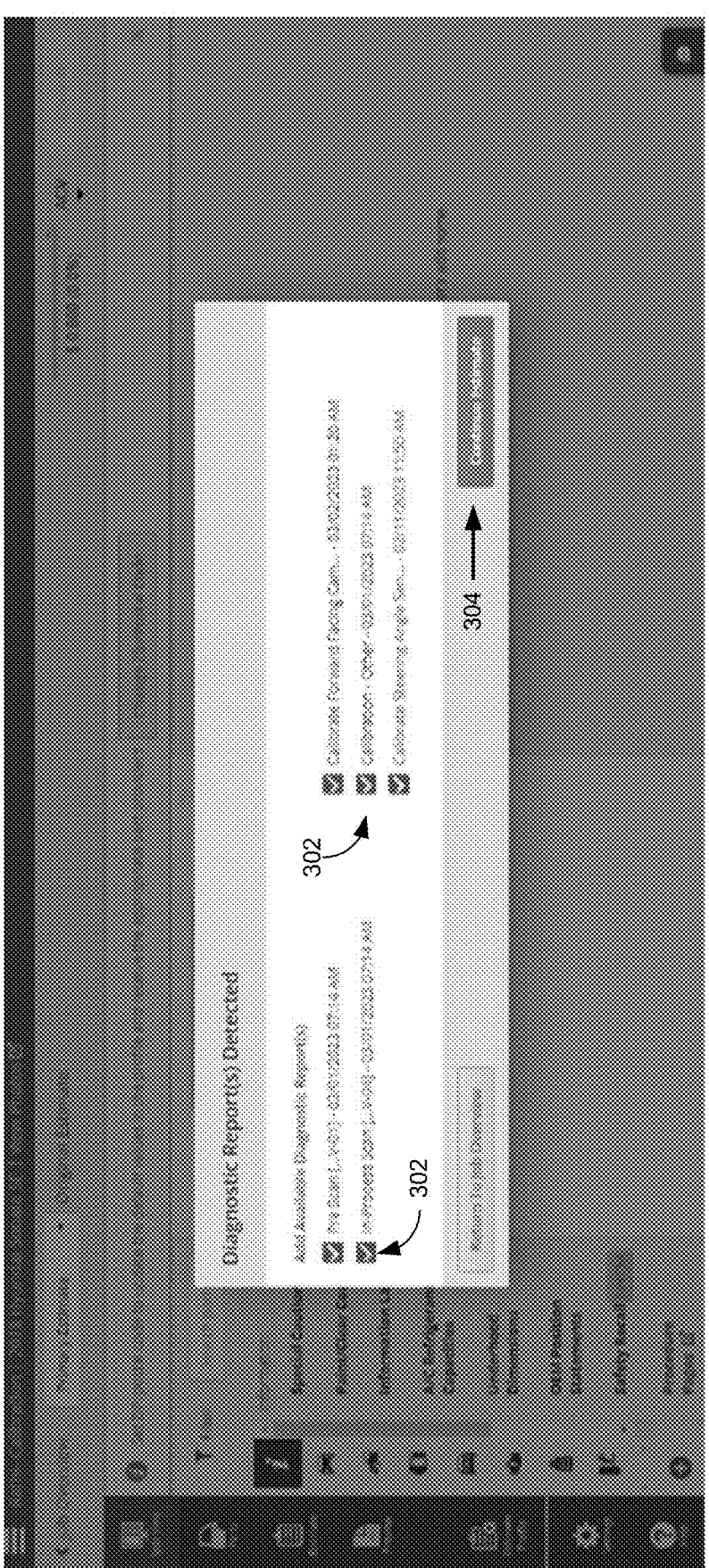
FIG. 3 depicts a portion of a user interface that presents scans and calibration reports that were found during such a search according to some embodiments of the disclosed technology.
Figure 4:
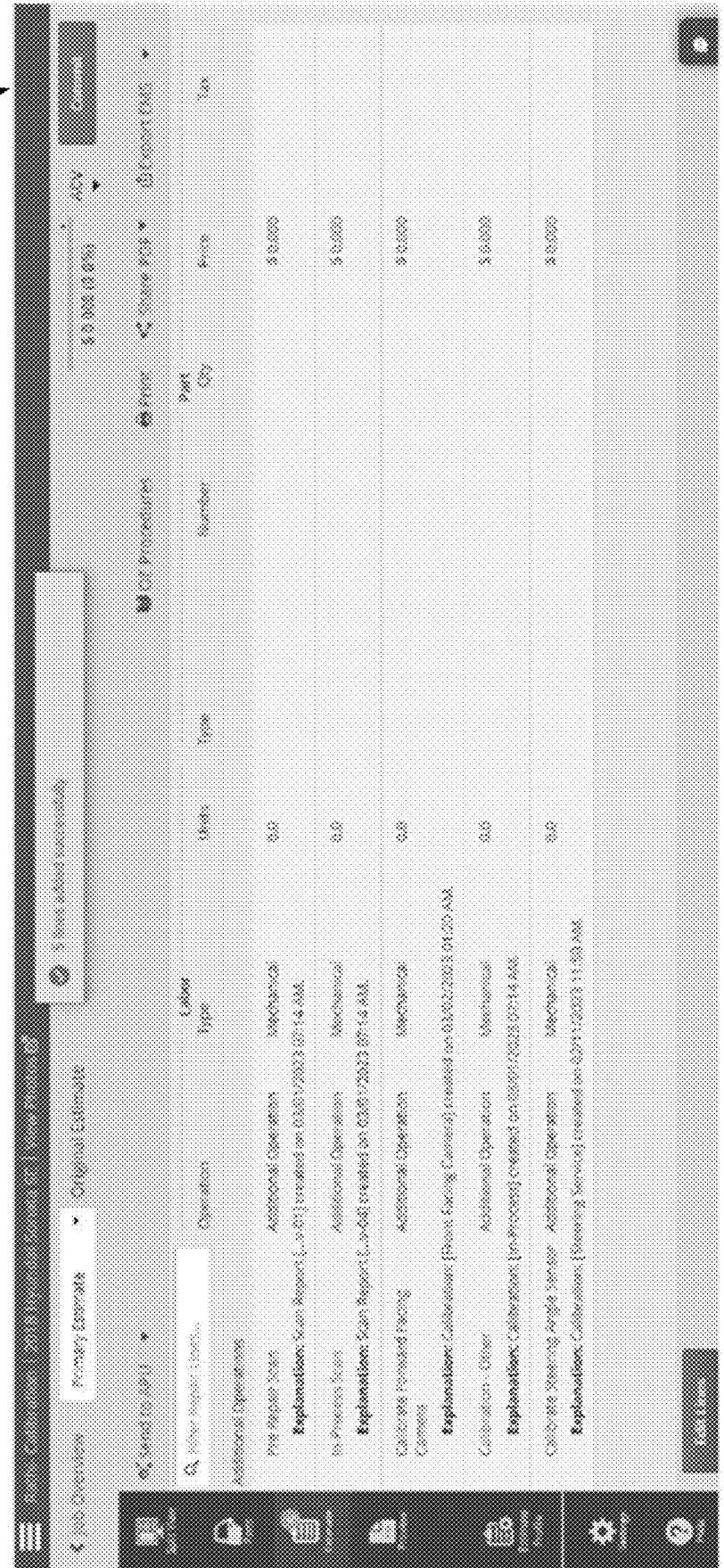
FIG. 4 depicts a portion of a user interface that includes a view of the vehicle repair estimate data structure according to some embodiments of the disclosed technology.

In some embodiments, generating the vehicle repair estimate data structure may include searching the stored templates for a saved line item to add to the estimate. For example, the tool 102 may query a cost database for the stored templates, and may receive saved line items from the cost database responsive to the querying. FIG. 3 depicts a portion of a user interface that presents scans and calibration reports that were found during such a search according to some embodiments of the disclosed technology. The user interface includes user-operable active elements including checkboxes 302 for selecting individual items for addition to the vehicle repair estimate data structure, and a button 304 for adding the selected items to the vehicle repair estimate data structure. FIG. 4 depicts a portion of a user interface that includes a view of the vehicle repair estimate data structure according to some embodiments of the disclosed technology. This view may be presented responsive to the user operating the button 304 in the user interface of FIG. 3. The user may commit the estimate by operating button 402 in the user interface of FIG. 4.

Figure 6:
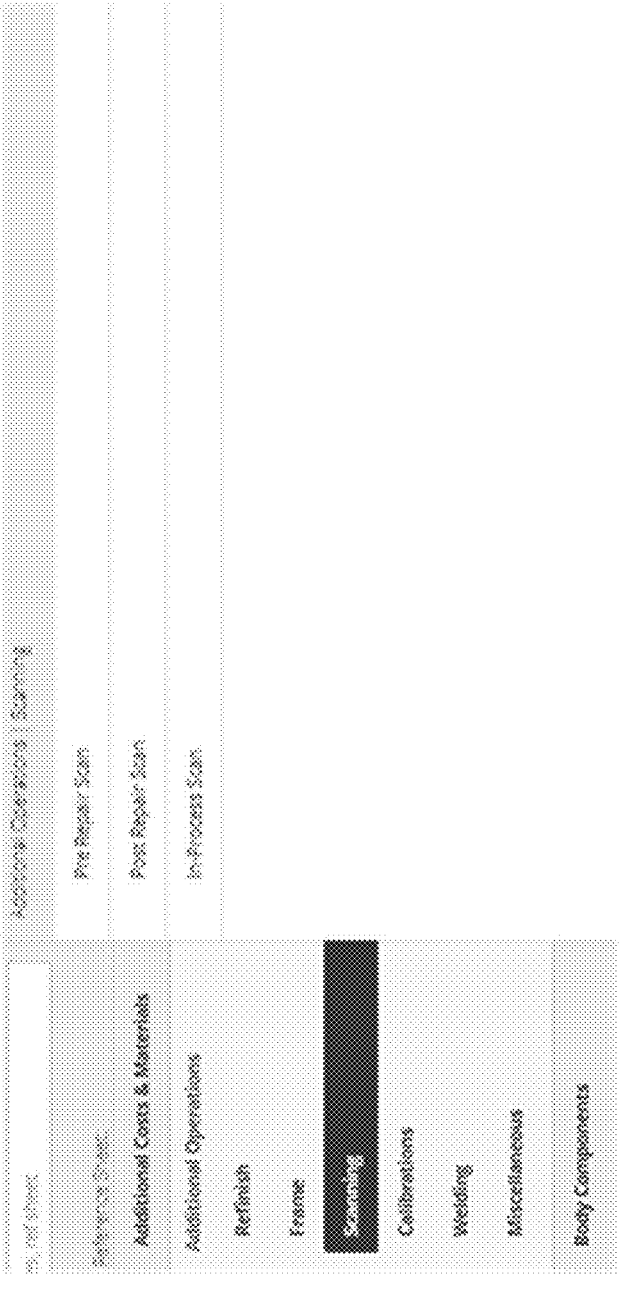
FIG. 6 depicts a portion of an example user interface that allows a user to add or remove one or more diagnostic scans in the estimate according to some embodiments of the disclosed technology.

If no appropriate saved line item is found, the tool 102 may add a placeholder reference sheet line to the estimate. FIGS. 5 and 6 depict a portion of an example user interface that allows a user to add manually add a placeholder line item to the estimate by specifying labor or price each. The user interface may allow the user to save this item in a template with a specific labor rate or price for later use. FIG. 5 depicts a portion of an example user interface that allows a user to add or remove one or more calibration scans in the estimate according to some embodiments of the disclosed technology. FIG. 6 depicts a portion of an example user interface that allows a user to add or remove one or more diagnostic scans in the estimate according to some embodiments of the disclosed technology.

Referring again to FIG. 2, the process 200 may include generating a user interface for presentation to a user on a user device. The user interface may include display elements that represent the populated fields of the vehicle repair estimate data structure, at 212. The display elements may include active display elements that allow the user to add, delete, or modify the lines of the estimate. The display elements may include active display elements that allow the user to commit the estimate. For example, the user interfaces may include the user interfaces of FIGS. 3-6.

Referring again to FIG. 2, the process 200 may include adjusting costs in the repair estimate data structure based on a user profile associated with the vehicle, at 214. In some embodiments, these values may be adjusted according to one or more stored user profiles. In some embodiments, these user profiles may contain preferences of an organization. By way of non-limiting example, the organization may be a carrier of an insurance policy. In some embodiments, these profiles may contain preferences of an individual. By way of non-limiting example, the individual may be an insurance claims adjuster. The profiles may include preferences for labor hours and rates, price point for parts and operations, and procedure type. The procedure type may indicate whether the procedure is an OEM procedure or an aftermarket procedure.

The process 200 may include providing the repair estimate data structure to a claims adjuster, at 216. In the example of FIG. 1, the user interface may be presented to the claims adjuster 114 by the client device 124, to the repairer 116 by the vehicle diagnostic hardware 126 or another device, to other users with other devices, or any combination thereof.

In some embodiments, the disclosed technologies may include the use of one or more trained machine learning models at one or more points in the described processes. Any machine learning models may be used. For example, the machine learning models and techniques may include classifiers, decision trees, neural networks, gradient boosting, and similar machine learning models and techniques. For example, a neural network may be trained and applied to receive as input an electronic claim record and a plurality of electronic vehicle diagnostic records and select one or more of the electronic vehicle diagnostic records.

The neural network may include a feature extraction layer that extracts features from the input data. In some embodiments, this process may be performed after input data preprocessing. The preprocessing may include input data transformation. The input data transformation may include converting different file types (e.g., image format, word format, etc.) into a unified digital format (e.g., pdf file). The preprocessing may include data extraction. The data extraction may include extracting useful information, for example using optical character recognition (OCR) and natural language processing (NLP) techniques.

The feature extraction in the feature extraction layer may be performed against the extracted data. The features for extraction may include identifiers of damaged parts identified in the electronic claim record. The features for extraction may include diagnostic trouble codes and calibration results in the electronic vehicle diagnostic records. The features for extraction may include the profiles for adjusting values in the estimate. The features for extraction may include an indicator of whether the estimate is original or is a supplement (that is, a revised version of the original estimate). The selection of the features for extraction may also be determined by learning importance scores for the candidate features using a tree-based machine learning model.

For example, the tree-based machine learning model for feature selection may use Random Forests or Gradient Boosting. The model includes an ensemble of decision trees that collectively make predictions. To begin, the tree-based model may be trained on a labeled dataset. The dataset may include historical electronic claim records and historical electronic vehicle diagnostic records, along with corresponding selected historical electronic vehicle diagnostic records. The selected historical electronic vehicle diagnostic records may be used as the ground truth labels for training purposes.

As the tree-based machine learning model learns to make predictions, it recursively splits the data (historical medical bills) based on different features, constructing a tree structure that captures patterns in the data. The goal of the training is to make the predictions as close to the ground truth labels as possible. One of the advantages of tree-based models is that they can generate feature importance scores for each input feature. These scores reflect the relative importance of each feature in contributing to the model's predictive power. A higher importance score indicates that a feature has a greater influence on the model's decision-making process.

In some embodiments, Gini importance metric may be used for feature importance in the tree-based model. Gini importance quantifies the total reduction in the Gini impurity achieved by each feature across all the trees in the ensemble. Features that lead to a substantial decrease in impurity when used for splitting the data are assigned higher importance scores.

Once the tree-based model is trained, the feature importance scores may be extracted. By sorting the features in descending order based on their scores, a ranked list of features may be obtained. This ranking enables prioritizing the features that have the most impact on the model's decision-making process.

Based on the feature ranking, the top features may be extracted from incoming electronic claim records and electronic vehicle diagnostic records and fed into the neural network to predict the electronic vehicle diagnostic records that should be selected.

The neural network may include an output layer that provides output data based on the input data. For example, the output layer of a classifier may use a sigmoid activation function that outputs a probability value between 0 and 1 for each class.

For example, the selection process described above for the Vehicle Repair Estimating Tool 102 may be implemented using a trained machine learning model. The model may be trained using training data that reflect historical electronic claim records and historical electronic vehicle diagnostic records and corresponding electronic vehicle diagnostic record selection. In some embodiments, the training data may include scores and weights of these records, as well as thresholds employed with the scoring.

During inference operation, these electronic records may be provided as inference input data to a trained machine learning model. An input layer of the model may extract one or more parameters as input data from the electronic records. Responsive to the inference input, an output layer of the model may provide output representing a selection probability for each electronic vehicle diagnostic record.

Some embodiments include training the machine learning models. The training may be supervised, unsupervised, or a combination thereof, and may continue between operations for the lifetime of the system. The training may include creating a training set that includes the input parameters and corresponding selections described above.

The training may include one or more second stages. A second stage may follow the training and use of the trained machine learning models, and may include creating a second training set, and training the trained machine learning models using the second training set. The second training set may include the inputs applied to the machine learning models, and the corresponding outputs generated by the machine learning models, during actual use of the machine learning models.

The second training stage may include identifying erroneous assessments generated by the machine learning model, and adding the identified erroneous assessments to the second training set. Creating the second training set may also include adding the inputs corresponding to the identified erroneous assessments to the second training set.

For example, the training may include supervised learning with labeled training data (e.g., historical inference input may be labeled with "automatic" or "manual" for training purposes). The training may be performed iteratively. The training may include techniques such as forward propagation, loss function, backpropagation for calculating gradients of the loss, and updating weights for each input.

The training may include a stage to initialize the model. This stage may include initializing parameters of the model, including weights and biases, and may be performed randomly or using predefined values. The initialization process may be customized to suit the type of model.

The training may include a forward propagation stage. This stage may include a forward pass through the model with a batch of training data. The input data may be multiplied by the weights, and biases may be added at each layer of the model. Activation functions may be applied to introduce non-linearity and capture complex relationships.

The training may include a stage to calculate loss. This stage may include computing a loss function that is appropriate for binary classification, such as binary cross-entropy or logistic loss. The loss function may measure the difference between the predicted output and the actual binary labels.

The training may include a backpropagation stage. Backpropagation involves propagating error backward through the network and applying the chain rule of derivatives to calculate gradients efficiently. This stage may include calculating gradients of the loss with respect to the model's parameters. The gradients may measure the sensitivity of the loss function to changes in each parameter.

The training may include a stage to update weights of the model. The gradients may be used to update the model's weights and biases, aiming to minimize the loss function. The update may be performed using an optimization algorithm, such as stochastic gradient descent (SGD) or its variants (e.g., Adam, RMSprop). The weights may be adjusted by taking a step in the opposite direction of the gradients, scaled by a learning rate.

The training may iterate. The training process may include multiple iterations or epochs until convergence is reached. In each iteration, a new batch of training data may be fed through the model, and the weights adjusted based on the gradients calculated from the loss.

The training may include a model evaluation stage. Here, the model's performance may be evaluated using a separate validation or test dataset. The evaluation may include monitoring metrics such as accuracy, precision, recall, and mean squared error to assess the model's generalization and identify possible overfitting.

The training may include stages to repeat and fine-tune the model. These stages may include adjusting hyperparameters (e.g., learning rate, regularization) based on the evaluation results and iterating further to improve the model's performance. The training can continue until convergence, a maximum number of iterations, or a predefined stopping criterion.

As a particular example, the machine learning models may be used to populate the fields of the repair estimate data structure. In this example, the training data set(s) may include correspondences between field values and field identifiers of the repair estimate data structure.

The disclosed technology provides numerous advantages over prior solutions. For example, the automatic linking of the diagnostic and claim records, and surfacing the documentation within the estimate automatically, saves the estimator time and provides evidence of safe and proper repair, while also ensuring estimate costs are captured properly for the repairer performing the diagnostic event. The disclosed technology may reveal relationships between damage and affected sensors that are not readily apparent. For example, while it may be apparent to an adjuster that a sensor in a damaged system should be calibrated, this may not be apparent when the sensor is not part of the damaged system. For example, rear-end impacts have been known to affect seat sensors. The disclosed technology may reveal such relationships.

Figure 7:
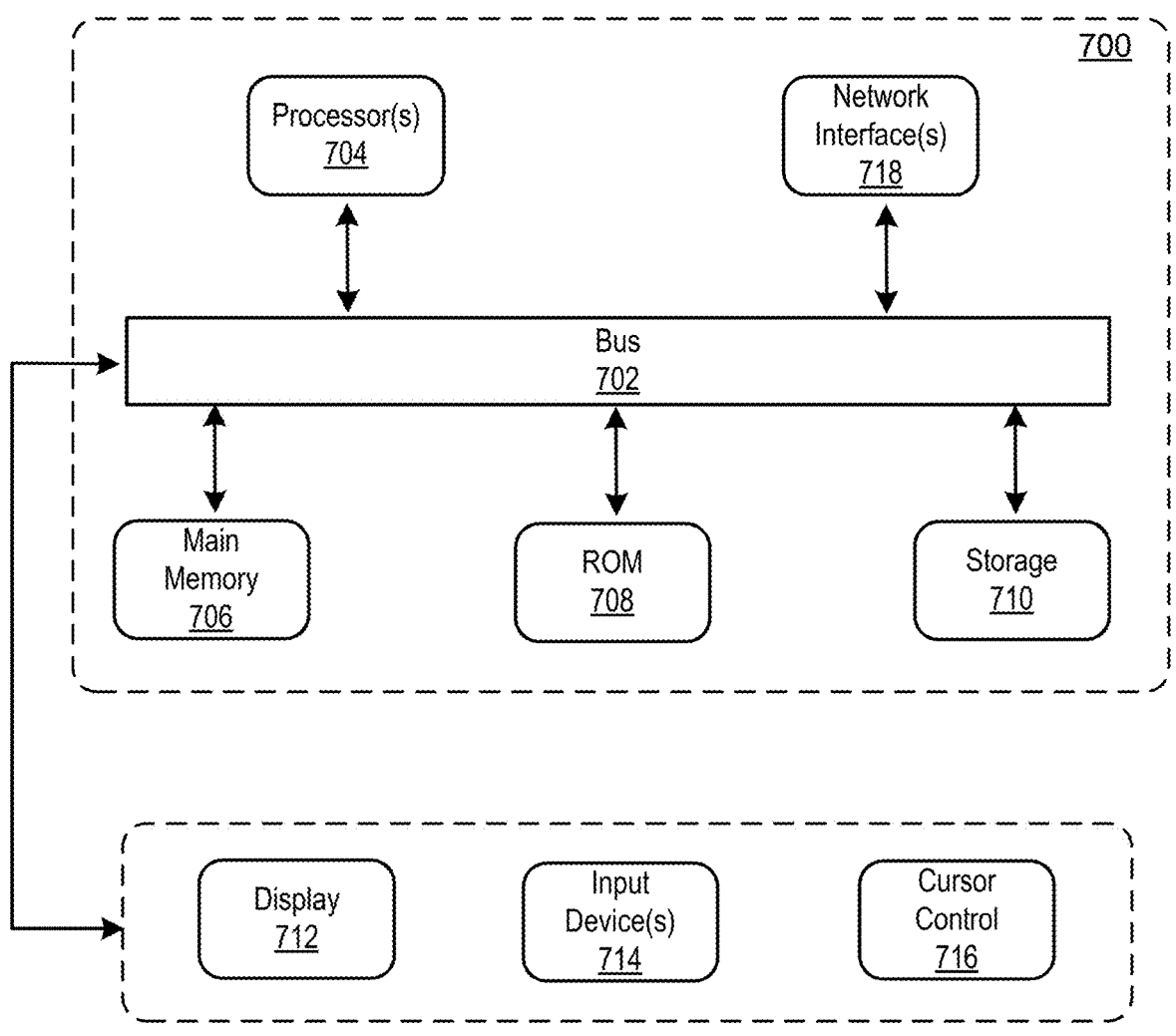
FIG. 7 depicts a block diagram of an example computer system in which embodiments described herein may be implemented.

FIG. 7 depicts a block diagram of an example computer system 700 in which embodiments described herein may be implemented. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hardwired circuitry may be used in place of or in combination with software instructions.

The term "non-transitory media," and similar terms, as used herein refers to any media that store data and/or instructions that cause a machine to operate in a specific fashion. Such non-transitory media may comprise nonvolatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a communication interface 718 coupled to bus 702. Network interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or a WAN component to communicate with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, or a combination of hardware and software. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The foregoing description of the present disclosure has been provided for the purposes of illustration and description. It is not intended to be exhaustive or to limit the disclosure to the precise forms disclosed. The breadth and scope of the present disclosure should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the disclosure and its practical application, thereby enabling others skilled in the art to understand the disclosure for various embodiments and with various modifications that are suited to the particular use contemplated. It is intended that the scope of the disclosure be defined by the following claims and their equivalence.

What is claimed is:

1. A system for automated generation of a vehicle repair estimate record using a vehicle damage claim and vehicle diagnostic records, comprising:
   a hardware processor; and
   a memory coupled with and readable by the processor and storing therein a set of instructions which, when executed by the processor, causes the processor to:
   obtain, from a database, an electronic claim record stored in the database and comprising claim data for a vehicle, wherein the claim data describes a vehicle and damage to the vehicle;
   obtain, from the database, a plurality of electronic vehicle diagnostic records stored in the database, wherein each electronic vehicle diagnostic record includes vehicle data obtained electronically from the vehicle during a respective electronic vehicle diagnostic event, wherein the plurality of electronic vehicle diagnostic records comprises one or more electronic vehicle diagnostic records corresponding to the obtained claim data and one or more electronic vehicle diagnostic records not corresponding to the obtained claim data;
   apply the obtained plurality of electronic vehicle diagnostic records and the obtained claim data as an inference input to a trained machine learning model, wherein the trained machine learning model has been trained with historical examples of the electronic vehicle diagnostic records and corresponding historical claim data;
   filter the one or more electronic vehicle diagnostic records corresponding to the obtained claims data using the trained machine learning model, wherein filtering the one or more electronic vehicle diagnostic records corresponding to the obtained claim data comprises selecting the one or more electronic vehicle diagnostic records corresponding to the obtained claim data from the obtained plurality of electronic vehicle diagnostic records based on the obtained claim data;
   obtain, from the database, a vehicle repair estimate data structure stored in the database and having a plurality of fields;
   populate the fields of the vehicle repair estimate data structure with at least one of the claim data and the vehicle data from the selected one or more electronic vehicle diagnostic records corresponding to the obtained claim data; and generate a user interface for presentation to a user on a user device, wherein the user interface includes display elements that represent the populated fields of the generated vehicle repair estimate data structure.

2. The system of claim 1, wherein populating the fields of the vehicle repair estimate data structure comprises:

searching stored templates by querying a cost database for the stored templates;

receiving line items from the cost database responsive to the querying; and adding the line items to the vehicle repair estimate data structure.

3. The system of claim 2, wherein the line items include costs, and wherein the instructions further cause the processor to:

obtain a stored user profile associated with the vehicle, wherein the stored user profile includes preferences for repair costs; and adjust individual ones of the costs in the line items according to the user profile.

4. The system of claim 1, wherein the instructions further cause the processor to:

provide the vehicle repair estimate data structure to a claims adjuster.

5. The system of claim 1, wherein the instructions further cause the processor to:

obtain one or more training data sets comprising the historical examples of the vehicle diagnostic records and corresponding historical claim data; and train the one or more trained machine learning models using the training data set.

6. The system of claim 5, wherein the instructions further cause the processor to:

generating the one or more training data sets.

7. The system of claim 5, wherein the instructions further cause the processor to:

obtain one or more further training data sets comprising further historical examples of the vehicle diagnostic records and corresponding historical claim data; and retrain the one or more trained machine learning models using the further training data set.

8. One or more non-transitory machine-readable storage media encoded with instructions that, when executed by one or more hardware processors of a computing system, cause the computing system to perform operations for automated generation of a vehicle repair estimate record using a vehicle damage claim and vehicle diagnostic records, the operations comprising:

obtain, from a database, an electronic claim record stored in the database and comprising claim data for a vehicle, wherein the claim data describes a vehicle and damage to the vehicle;

obtain, from the database, a plurality of electronic vehicle diagnostic records stored in the database, wherein each electronic vehicle diagnostic record includes vehicle data obtained electronically from the vehicle during a respective electronic vehicle diagnostic event, wherein the plurality of electronic vehicle diagnostic records comprises one or more electronic vehicle diagnostic records corresponding to the obtained claim data and one or more electronic vehicle diagnostic records not corresponding to the obtained claim data;

applying the obtained plurality of electronic vehicle diagnostic records and the obtained claim data as an inference input to a trained machine learning model, wherein the trained machine learning model has been trained with historical examples of the electronic vehicle diagnostic records and corresponding historical claim data;

filter the one or more electronic vehicle diagnostic records corresponding to the obtained claims data using the trained machine learning model, wherein filtering the one or more electronic vehicle diagnostic records corresponding to the obtained claim data comprises selecting the one or more electronic vehicle diagnostic records corresponding to the obtained claim data from the obtained plurality of electronic vehicle diagnostic records based on the obtained claim data;

obtain, from the database, a vehicle repair estimate data structure stored in the database and having a plurality of fields;

populate the fields of the vehicle repair estimate data structure with at least one of the claim data and the vehicle data from the selected one or more electronic vehicle diagnostic records corresponding to the obtained claim data; and generate a user interface for presentation to a user on a user device, wherein the user interface includes display elements that represent the populated fields of the generated vehicle repair estimate data structure.

9. The one or more non-transitory machine-readable storage media of claim 8, wherein populating the fields of the vehicle repair estimate data structure comprises:

searching stored templates by querying a cost database for the stored templates;

receiving line items from the cost database responsive to the querying; and adding the line items to the vehicle repair estimate data structure.

10. The one or more non-transitory machine-readable storage media of claim 9, wherein the line items include costs, and wherein the instructions further cause the processor to:

obtain a stored user profile associated with the vehicle, wherein the stored user profile includes preferences for repair costs; and obtain individual ones of the costs in the line items according to the user profile.

11. The one or more non-transitory machine-readable storage media of claim 8, wherein the instructions further cause the processor to:

provide the vehicle repair estimate data structure to a claims adjuster.

12. The one or more non-transitory machine-readable storage media of claim 8, wherein the instructions further cause the processor to:

obtain one or more training data sets comprising the historical examples of the vehicle diagnostic records and corresponding historical claim data; and train the one or more trained machine learning models using the training data set.

13. The one or more non-transitory machine-readable storage media of claim 12, wherein the instructions further cause the processor to:

generate the one or more training data sets.

14. The one or more non-transitory machine-readable storage media of claim 12, wherein the instructions further cause the processor to:

obtain one or more further training data sets comprising further historical examples of the vehicle diagnostic records and corresponding historical claim data; and retrain the one or more trained machine learning models using the further training data set.

15. A computer-implemented method for automated generation of a vehicle repair estimate record using a vehicle damage claim and vehicle diagnostic records, the computer-implemented method comprising:

an electronic claim record stored in a database and comprising claim data for a vehicle, wherein the claim data describes a vehicle and damage to the vehicle;

obtaining, from the database, a plurality of electronic vehicle diagnostic records stored in the database, wherein each electronic vehicle diagnostic record includes vehicle data obtained electronically from the vehicle during a respective electronic vehicle diagnostic event, wherein the plurality of electronic vehicle diagnostic records comprises one or more electronic vehicle diagnostic records corresponding to the obtained claim data and one or more electronic vehicle diagnostic records not corresponding to the obtained claim data;

applying the obtained plurality of electronic vehicle diagnostic records and the obtained claim data as an inference input to a trained machine learning model, wherein the trained machine learning model has been trained with historical examples of the electronic vehicle diagnostic records and corresponding historical claim data;

filtering the one or more electronic vehicle diagnostic records corresponding to the obtained claims data using the trained machine learning model, wherein filtering the one or more electronic vehicle diagnostic records corresponding to the obtained claim data comprises selecting the one or more electronic vehicle diagnostic records corresponding to the obtained claim data from the obtained plurality of electronic vehicle diagnostic records based on the obtained claim data;

obtaining, from the database, a vehicle repair estimate data structure stored in the database and having a plurality of fields;

populating the fields of the vehicle repair estimate data structure with at least one of the claim data and the vehicle data from the selected one or more electronic vehicle diagnostic records corresponding to the obtained claim data; and generating a user interface for presentation to a user on a user device, wherein the user interface includes display elements that represent the populated fields of the generated vehicle repair estimate data structure.

16. The method of claim 15, wherein populating the fields of the vehicle repair estimate data structure comprises:

searching stored templates by querying a cost database for the stored templates;

receiving line items from the cost database responsive to the querying; and adding the line items to the vehicle repair estimate data structure.

17. The method of claim 16, wherein the line items include costs, the method further comprising:

obtaining a stored user profile associated with the vehicle, wherein the stored user profile includes preferences for repair costs; and adjusting individual ones of the costs in the line items according to the user profile.

18. The method of claim 15, further comprising:

providing the vehicle repair estimate data structure to a claims adjuster.

19. The method of claim 15, further comprising:

obtaining one or more training data sets comprising the historical examples of the vehicle diagnostic records and corresponding historical claim data; and training the one or more trained machine learning models using the training data set.

20. The method of claim 19, further comprising:

generating the one or more training data sets.

* * * * *